(12) United States Patent
Mulder et al.

(10) Patent No.: US 9,032,522 B1
(45) Date of Patent: May 12, 2015

(54) PLC BACKPLANE ANALYZER FOR FIELD FORENSICS AND INTRUSION DETECTION

(71) Applicant: Sandia Corporation, Albuquerque, NM (US)

(72) Inventors: John Mulder, Albuquerque, NM (US); Moses Daniel Schwartz, Albuquerque, NM (US); Michael Berg, Albuquerque, NM (US); Jonathan Roger Van Houten, Albuquerque, NM (US); Jorge Mario Urrea, Albuquerque, NM (US); Michael Aaron King, Albuquerque, NM (US); Abraham Anthony Clements, Albuquerque, NM (US); Jason Trent, Silver Spring, MD (US); Jennifer M. Depoy, Albuquerque, NM (US); Joshua Jacob, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 58 days.

(21) Appl. No.: 13/947,887

(22) Filed: Jul. 22, 2013

Related U.S. Application Data

(60) Provisional application No. 61/674,711, filed on Jul. 23, 2012.

(51) Int. Cl.
*H04L 29/00* (2006.01)
*G06F 21/55* (2013.01)

(52) U.S. Cl.
CPC .................... *G06F 21/552* (2013.01)

(58) Field of Classification Search
USPC .............................. 709/223; 726/4
See application file for complete search history.

(56) References Cited

U.S. PATENT DOCUMENTS 7,853,677 B2* 12/2010 Callaghan ..................... 709/223
2012/0297461 A1* 11/2012 Pineau ................................ 726/4

OTHER PUBLICATIONS

Kushner, David, "The Real Story of Stuxnet", Retrieved at <<http://spectrum.ieee.org/telecom/security/the-real-story-of-stuxnet>>, Feb. 26, 2013, pp. 1-4.
"Stuxnet", Retrieved at <<http://en.wikipedia.org/wiki/Stuxnet>>, May 9, 2013, pp. 1-18.

* cited by examiner

*Primary Examiner* — Brandon Hoffman
*Assistant Examiner* — Michael D Anderson
(74) *Attorney, Agent, or Firm* — Medley Behrens & Lewis, LLC

(57) ABSTRACT

The various technologies presented herein relate to the determination of unexpected and/or malicious activity occurring between components communicatively coupled across a backplane. Control data, etc., can be intercepted at a backplane where the backplane facilitates communication between a controller and at least one device in an automation process. During interception of the control data, etc., a copy of the control data can be made, e.g., the original control data can be replicated to generate a copy of the original control data. The original control data can continue on to its destination, while the control data copy can be forwarded to an analyzer system to determine whether the control data contains a data anomaly. The content of the copy of the control data can be compared with a previously captured baseline data content, where the baseline data can be captured for a same operational state as the subsequently captured control data.

20 Claims, 9 Drawing Sheets

PLC BACKPLANE ANALYZER FOR FIELD FORENSICS AND INTRUSION DETECTION

RELATED APPLICATION

This application claims priority to U.S. Provisional Patent Application No. 61/674,711, filed on Jul. 23, 2012, entitled "PLC BACKPLANE ANALYZER FOR FIELD FORENSICS AND INTRUSION DETECTION", the entirety of which is incorporated herein by reference.

STATEMENT OF GOVERNMENTAL INTEREST

This invention was developed under contract DE-AC04-94AL85000 between Sandia Corporation and the U.S. Department of Energy. The U.S. Government has certain rights in this invention.

BACKGROUND

Computer systems have found numerous applications in the industrial automation environment and are employed ubiquitously throughout, e.g., to control and/or monitor the operation of a process, machine, tool, device, and the like. To facilitate control of a process, etc., one or more controllers (e.g., a programmable logic controller (PLC)) are utilized with input/output (I/O) devices controlling operation of the process along with gathering process information (e.g., measurements, data, values, parameters, variables, metadata, etc.) pertaining to how the process is performing.

As highlighted by the STUXNET attack, discovered in June 2010, process control operations, and PLCs in particular, have become a focus for malicious attack, such as a computer worm, virus or other malware. As a generalized overview, the STUXNET attack involved a computer worm taking control of a PLC, the PLC was controlled to effect destruction of a component and/or apparatus while at the same time, the PLC was reporting that the component/apparatus was operating correctly. A contemporary approach for verification of PLC integrity can involve requesting content of the PLC firmware and/or logic over a network, whereby the integrity of the PLC can be remotely determined. In another approach, traffic (e.g., data, commands, etc.) can be examined as it flows into and/or out of a control network associated with the PLC. However, as mentioned with regard to the STUXNET attack, the firmware/logic read-back approach and the traffic on the control network can be subverted.

SUMMARY

The following is a brief summary of subject matter that is described in greater detail herein. This summary is not intended to be limiting as to the scope of the claims.

Various exemplary embodiments presented herein relate to determining unexpected and/or malicious activity occurring between components communicatively coupled across a backplane. In an exemplary embodiment, an analyzer system can be configured to compare operational data with baseline data, wherein the operational data is captured for an operational state for which the baseline data has been previously captured. In another embodiment, based at least in part upon the comparison, a determination can be made regarding whether there is an anomaly between content of the operational data and content of the baseline data. In an embodiment, the operational data and baseline data can be captured from a backplane.

Another exemplary embodiment comprises a method for determination of unexpected and/or malicious activity occurring between components communicatively coupled across a backplane is presented. The method comprising determining, based at least on comparing operational data with baseline data, whether there is an anomaly between content of the operational data and content of the baseline data, wherein the operational data is captured for an operational state for which the baseline data has been previously captured. In an embodiment, the operational data and the baseline data can be captured across a backplane.

A further exemplary embodiment for determination of unexpected and/or malicious activity occurring between components communicatively coupled across a backplane comprises a computer-readable medium comprising instructions that, when executed by a processor, cause the processor to perform acts comprising capturing baseline data and operational data, wherein the operational data is captured for an operational state for which the baseline data has been previously captured, the baseline data and the operational data being captured between a controller and at least one device in communication with the controller. In an embodiment, the communication being via a backplane connecting the controller with the at least one device. In a further embodiment, a determining operation, based at least on comparing the operational data with the baseline data, to determine whether there is an anomaly between content of the operational data and content of the baseline data.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
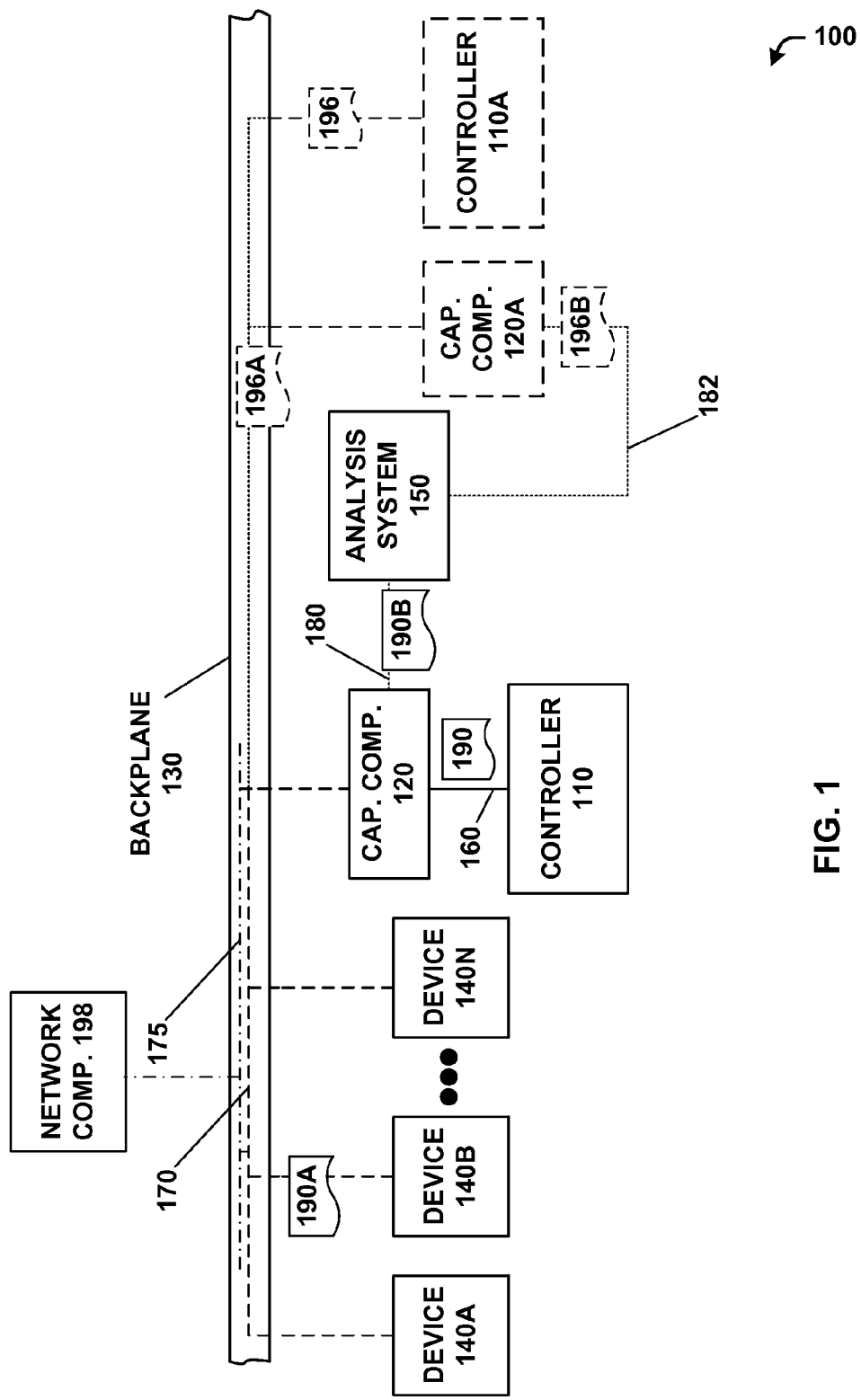
FIG. 1 is a block diagram illustrating exemplary embodiments for determination of unexpected and/or malicious activity occurring between components communicatively coupled across a backplane.

Various technologies pertaining to determination of unexpected and/or malicious activity occurring between components communicatively coupled across a backplane are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Additionally, as used herein, the term "exemplary" is intended to mean serving as an illustration or example of something, and is not intended to indicate a preference.

As noted above, exemplary embodiments presented herein relate to determination of unexpected and/or malicious activity occurring between components communicatively coupled across a backplane. Control data, instructions, measurements, and the like, can be intercepted at a backplane where the backplane facilitates communication between a controller and at least one device. During interception of the control data, etc., a copy of the control data can be made (e.g., the original control data can be replicated to generate a copy of the original control data). The original control data can continue on to either the controller or the at least one device, while the control data copy can be forwarded to an analyzer system to determine whether the control data contains unexpected content, e.g., a data anomaly. The content of the copy of the control data can be compared with a previously captured baseline data content, where the baseline data can be captured for a same operational state as the subsequently captured control data. Based on an anomaly being detected, a notification of the anomaly can be generated to facilitate the controller, at least one device, etc., associated with a process being controlled by the controller to be placed in a safe operating state. In effect, the content of a first control data instance can be compared with the content of a second control data instance to determine if there is a difference between the respective contents, whereby the second control data instance can act as a template to the first control data instance. The various, exemplary embodiments are now described with reference to the drawings, wherein like reference numerals are used to refer to like elements throughout. A controller can be a PLC, however the various aspects presented herein relate to any controller including a programmable automation controller (PAC), a remote terminal/telemetry unit (RTU), etc.

FIG. 1 illustrates a process control configuration 100 in an industrial automation environment, according to an exemplary embodiment. In the exemplary embodiment presented in FIG. 1, a controller 110 is in communication, via backplane 130, with one or more devices 140A-140N, where N is a positive integer. Devices 140A-140N can be any device associated with an operation controlled/monitored by controller 110. For example, in a non-exhaustive listing, devices 140A-140N can be any of an I/O device, a controller, a sensor, an interface, a human machine interface (HMI), a graphical user interface (GUI), a device, a machine, a tool, a motor, a component, software, etc., to facilitate performing at least one operation in the industrial automation environment.

Located in conjunction with controller 110 and backplane 130 is capture component 120. Capture component 120 can be utilized to capture data, information, a command, a command instruction, traffic, a control signal, etc. (hereinafter collectively referred to as "data" or "command instruction"), being conveyed across backplane 130 (e.g., between controller 110 and any of devices 140A-140N) and along with facilitating conveyance of the data, across the backplane 130, capture component 120 can also forward a copy of the data, to an analyzer system 150. For example, controller 110 can generate a command instruction 190 directed at device 140B, with the command instruction 190 being initially conveyed on data-path 160 between controller 110 and capture component 120. Upon receipt of the command instruction 190 at capture component 120, a command instruction 190A can be forwarded by capture component 120 to device 140B along data-path 170. For example, when a stream of data included in command instruction 190 is received at capture component 120, the sequence of content in the command instruction 190 can effectively be transmitted uninterrupted, as command instruction 190A, to device 140B. Further, upon receipt of the command instruction 190 at capture component 120, a replication of command instruction 190 can be generated at capture component 120, whereupon the command instruction copy 190B can be forwarded by capture component 120 to analyzer system 150, e.g., via data path 180. As further explained herein, command instruction 190B can be analyzed at analyzer system 150 to confirm that command instruction 190B, and accordingly, command instruction 190A, comprises expected content. Expected content can include any of a command, an instruction, a measurement, a setpoint, a device address, etc., as required to facilitate operation of one or more devices associated with controller 110 in the industrial automation environment.

In the event of command instruction 190B comprising expected content components included in process monitoring configuration 100 are considered to be operating correctly, e.g., firmware or logic of controller 110 has not been compromised.

In the event of command instruction 190B comprising unexpected content (e.g., an unexpected command directed to device 140B), at least one component included in process monitoring configuration 100 can be considered to be operating incorrectly, e.g., firmware or logic of controller 110 has been compromised.

It is to be appreciated that while FIG. 1 illustrates capture component 120 being located adjacent to backplane 130 (e.g., attached to backplane 130), capture component 120 can be located in any suitable location to facilitate operation of the various embodiments presented herein. For example, capture component 120 can be co-located/incorporated into controller 110, capture component 120 can be co-located/incorporated into backplane 130, capture component 120 can be co-located/incorporated into any of devices 140A-140N, etc. Further, either of the capture component 120 or the analyzer system 150 can be interposed between the controller and the backplane thereby enabling either of the capture component 120 or the analyzer system 150 to act as a firewall or proxy device to regulate and/or validate behavior of any of the controller 110, the backplane 130, devices 140A-N, etc. In an embodiment, analyzer system 150 can be connected directly to capture component 120 to facilitate communication of data therebetween. In another embodiment, analyzer system 150 can be connected to capture component 120 via the backplane 130, whereby communication of data between capture component 120 and the analyzer system 150 is via backplane 130. In another embodiment, capture component 120 can be incorporated into analyzer system 150, for example, analyzer system 150 may form part of a HMI or a GUI associated with the process control system, e.g., the HMI/GUI is operating on a machine, whereby the machine is being controlled at least in part by controller 110 which is in communication with capture component 120.

It is to be appreciated that while FIG. 1 illustrates capture component 120 being located between controller 110 and backplane 130, in a configuration, backplane 130 can be a shared backplane whereby a capture component (e.g., capture component 120A) can be connected to backplane 130 and capture control data (e.g., command instruction 196) being transmitted between a controller (e.g., controller 110A) connected directly to the backplane 130. Rather than controller 110A being connected to backplane 130 via a capture component (e.g., capture component 120), controller 110A can direct command instruction 196 directly to a device (e.g., any of devices 140A-N), whereby command instruction 196 or return data 196A from the device to controller 110A can be captured by capture component 120A. Command instruction 196 and/or return data 196A can be replicated at capture component 120A and forwarded as data 196B to analysis system 150. Further, in another embodiment, a plurality of capture components can be utilized in a process control/monitoring system, whereby each capture component can be operating directly with one or more controllers with data captured by each capture component being amalgamated at one or more analyzer systems to facilitate system-wide/process-wide monitoring in an industrial automation system.

Further, while the various embodiments presented herein relate to capturing command instructions and/or data being conveyed by backplane 130, the various concepts can be extended to include capturing and analyzing command instructions and/or data being conveyed to a controller 110 and/or any device 140A-N via network 175. Any command instruction and/or data being conveyed via network 175 can be transmitted in conjunction with a network component 198, where network component 178 can be connected directly to backplane 130 (e.g., via a slot in a chassis associated with backplane 130) or network component 178 can be remotely connected. Capturing of data, etc., being conveyed on a network associated with one or more components comprising system 100 can supplement understanding of data (e.g., command instruction 190 or 196) being captured on the backplane 130. For example, controller 110 may have received instructional data which originated via network component 198. Upon complying with the instructional data, controller 110 can generate a control instruction 190 for any of devices 140A-N. Alternatively, controller 110 may have been compromised and generates data for transmission over network 175. Analysis of the network based data can further understanding of how, when, etc., controller 110 may have been compromised.

Figure 2:
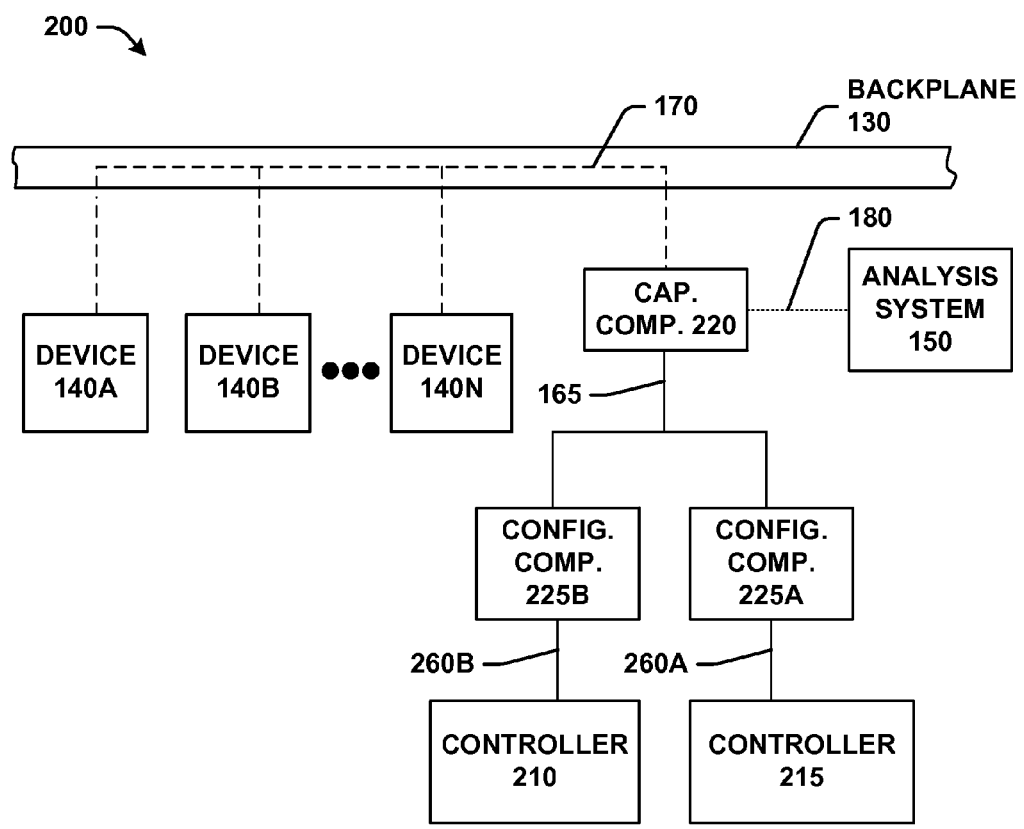
FIG. 2 is a block diagram illustrating exemplary embodiments for determination of unexpected and/or malicious activity occurring between components communicatively coupled across a backplane.

Turning briefly to FIG. 2, a process monitoring configuration 200 is illustrated according to an exemplary embodiment. In comparison with process monitoring configuration 100, process monitoring configuration 200 includes a capture component 220 connected to a pair of configuration components 225A and 225B. Configuration components 225A and 225B can, in an embodiment, each operate as a protocol convertor(s), converting one or more protocols to a common protocol, as explained further below. Configuration component 225A is connected, via data-path 260A to controller 215, and configuration component 225B is connected, via data-path 260B to controller 210. A plurality of manufacturers (e.g., original equipment manufacturers (OEM's)) is available to provide control components (e.g., controllers 210 and 215) for utilization in an industrial automation environment. Each manufacturer can utilize their own proprietary control software/protocol, where a first proprietary control software may not be able to operate in conjunction with a second proprietary control software. For example, controller 210 may be manufactured by a first OEM, while controller 215 may be manufactured by a second OEM, whereby the first OEM operating system may be incompatible with the second OEM operating system. Thus, one or more configuration components 225A and 225B can be incorporated into process monitoring configuration 200 to facilitate conversion of a proprietary control language to a common control language which can be analyzed at analyzer system 150. For example, configuration component 225A can be utilized to convert operating instructions and data formatted in accordance with the second OEM operating system to a common format suitable for analysis by analyzer system 150, and configuration component 225B can be utilized to convert operating instructions and data formatted in accordance with the first OEM operating system to the common format suitable for analysis by analyzer system 150.

It is to be appreciated that while configuration components 225A and 225B are illustrated as being separate from capture component 220, the various embodiments presented herein are not so limited and one or more configuration components (e.g., any of configuration components 225A and/or 225B) can be located as required across process monitoring configurations 100 and 200. For example, the configuration component(s) can be incorporated into capture component 220, or further incorporated into analyzer system 150, etc. Furthermore, while configuration components 225A and 225B are presented above facilitating conversion of data, etc., between a plurality of proprietary control software/protocols, configuration components 225A and 225B can be configured in accordance with any situation requiring data to be converted from one protocol to another. For example, configuration components 225A and 225B can be utilized to facilitate conversion from a first network protocol to a second network protocol to enable data to be transmitted between controller 110 and network component 198.

Figure 3:
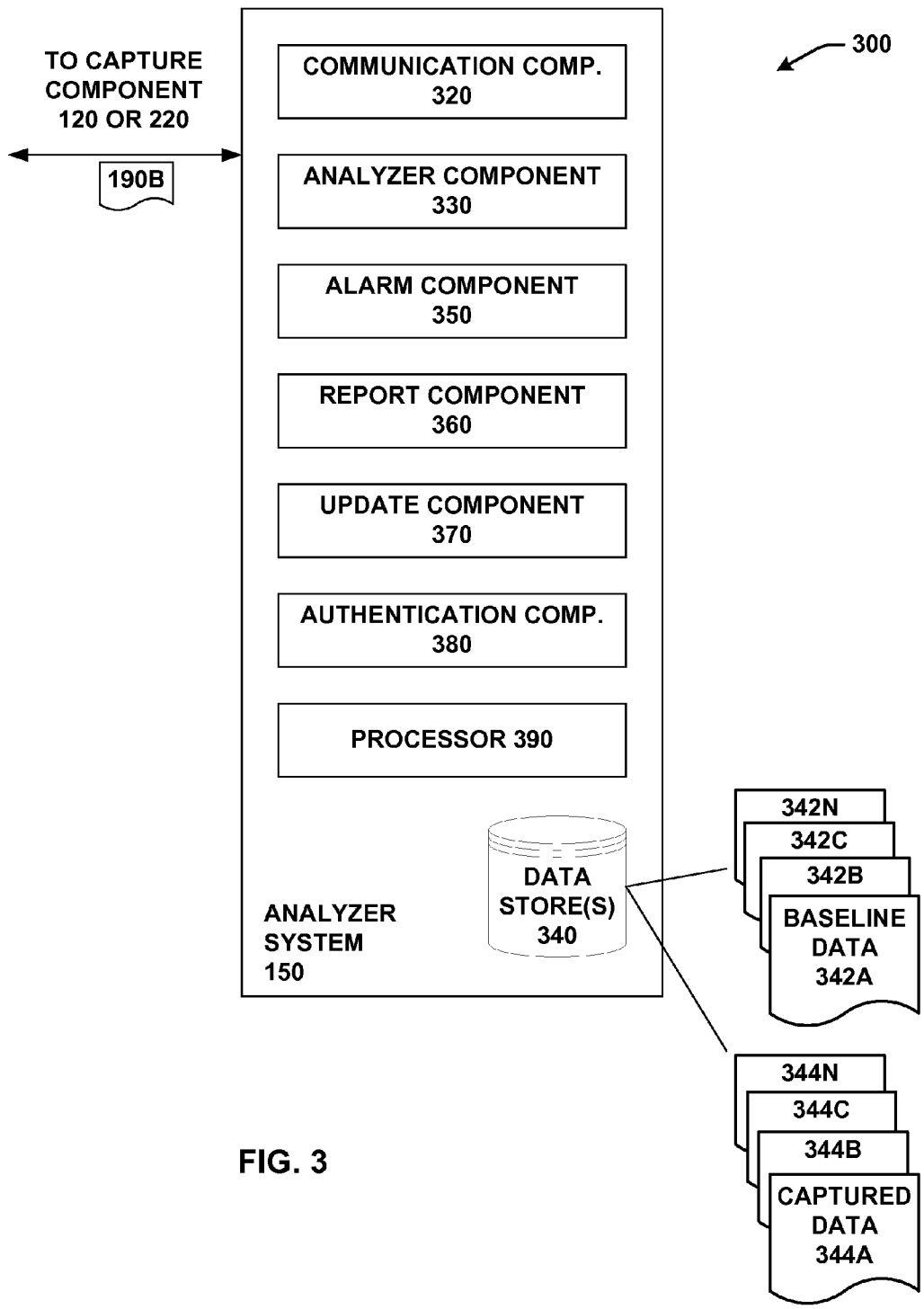
FIG. 3 is a block diagram illustrating an exemplary analyzer system for analysis of data being communicated on a backplane.

FIG. 3 illustrates an analyzer configuration 300 according to an exemplary embodiment. Analyzer configuration 300 can include an analyzer system 150 which can comprise of a plurality of components as described further herein. As previously mentioned, analyzer system 150 can be in communication with capture component 120 (or capture component 220), whereby analyzer system 150 can include a communication component 320 which be utilized to communicate with capture component 120 in accord with any communication protocol/format required to facilitate communication between analyzer system 150 and capture component 120 either directly, or via backplane 130. A communication protocol/format can comprise of any of transmission control protocol (TCP), internet protocol (IP), a network protocol, a serial protocol, a parallel protocol, a hypertext transfer protocol (HTTP), an automation communication network protocol, common industrial protocol (CIP), a manufacturer specific protocol such as EtherNet/IP, Sinec H1, service request transport protocol (GE-SRTP), ControlNET, DeviceNET, peripheral component interconnect express (PCIe), RS-232, serial data interface (SDI-12), Modbus, etc.

Data received at analyzer system 150 can be stored, e.g., in data store(s) 340. As previously mentioned, during initial configuration of process monitoring configuration 100, controller 110 can be operated in a number of 'states' to facilitate collection of baseline data, wherein the baseline data can act to identify communications (e.g., command instruction 190B) that occurs between controller 110 and any other devices/components comprising process monitoring configuration 100. Hence, for each operational state of controller 110, baseline data (e.g., baseline data 342A-342N, where N is a positive integer) can be captured (e.g., by capture component 120) and stored in data store(s) 340. For each operational state, baseline data can be captured, hence in a first operational state baseline data 342A is captured, in a second operational state baseline data 342B is captured, in a third operational state baseline data 342C is captured, in an Nth operational state baseline data 342N is captured, etc. Each of the stored baseline data (e.g., any of baseline data 342A-N) can be uniquely identified, for example, in accord with an operational state associated with the state of controller 110 during capture of the baseline data. For example, in an instance, controller 110 may be issuing a command to a heater associated with device 140A to increase a temperature of a furnace to a specific holding temperature, and thus baseline data (e.g., baseline data 342A) captured during such an operational state of controller 110 can be identified as 'furnace holding temperature'. In another instance, for example, controller 110 may be issuing a command to a motor associated with device 140N to increase a speed of rotation from a first rotational velocity to a second rotational velocity to facilitate achievement of a particular operation, e.g., a milling operation, and thus baseline data (e.g., baseline data 342N) captured during such an operational state of controller 110 can be identified as 'milling speed'. It is to be appreciated that the various operational states associated with controller 110 and an industrial automation operation(s) are vast, and any suitable identifier can be applied to a baseline data configuration, where the identifier can be alphanumeric, date, time, symbol, etc., to facilitate identification and hence, subsequent retrieval of a baseline data configuration (e.g., any of baseline data 342A-N). As previously mentioned, content comprising baseline data 342A-N can include any of a command, an instruction, a measurement, a setpoint, a device address, etc., as required to facilitate operation of one or more devices associated with controller 110 in the industrial automation environment 100.

Upon subsequent operation of one or more components comprising an industrial automation environment, as one or more commands, etc., are generated by, or received at, controller 110, (e.g., command instruction 190) a replication of the one or more commands can be generated by capture component 120 and forwarded to analyzer system 150, e.g., capture component 120 forwards a copy 190B of command instruction 190 to analyzer system 150. Based upon the operational state of controller 110, or other device in the process control configuration 100 of the industrial automation environment, each operational state can be identified to facilitate comparison of captured data with a baseline data, as stored in datastore 340. Analyzer component 330 can be utilized to facilitate comparison of data comprising an operational state (e.g., command instruction 190B) with baseline data (e.g., baseline data 342C) captured during the initial configuration of controller 110 for a particular operational state. Hence, in an exemplary operation, command instruction 190B can be tagged with an identifier (e.g., as a header file, or the like) indicating the operational state of controller 110 during replication of command instruction 190. Analyzer component 330 can review the command instruction 190B identifier, and based thereon, retrieve a corresponding baseline data file. In an example, command instruction 190B was captured during an operation to increase a furnace temperature and hence command instruction 190B is tagged with an identifier 'furnace holding temperature', and based thereon, analyzer component 330 can facilitate retrieval of the previously stored baseline data 342A, which continuing the prior example, also pertains to 'furnace holding temperature'. It is to be appreciated that an instance of data (e.g., a captured command instruction 190B, any of baseline data 342A-N) can be tagged with any information to facilitate comparison of captured data with baseline data, for example, each data instance can also have a date/timestamp associated therewith to facilitate identification by analyzer component 330, or any other component, of when a particular instance of data was captured, e.g., to facilitate subsequent analysis (e.g., diagnostic analysis, forensic analysis, etc.) of operation of a particular device comprising an industrial control environment. Analysis of captured data (e.g., command instruction 190B) with baseline data can be based on any suitable technique (e.g., an algorithm) such as a distance based technique, a support vector analysis, cluster analysis, etc., from which any anomaly of the captured data with the baseline data can be identified. Further, analysis can include parsing of the backplane data, displaying the backplane data (e.g., on a display associated with analyzer system 150), enabling an operator to filter the backplane data based on such techniques as submodule addressing, message type, data conversation between devices, etc.

In an embodiment, to facilitate expeditious analysis of content comprising captured data (e.g., command instruction 190B) versus data content of a baseline data (e.g., any of baseline data 342A-N), once an anomaly in content has been identified, analyzer component 330 can include further logic to facilitate further understanding of the anomaly. For example, based upon a particular anomaly being identified, analyzer component 330 includes logic (e.g., artificial intelligence) that can facilitate selection of a technique from a plurality of available techniques (e.g., a statistical machine learning technique, a Bayesian classification, a neural network technique, a distance based technique, a similarity technique, a Chi Squared classifier technique, a support vector analysis, a cluster analysis, etc.) that is best able to identify the anomaly, one or more components or devices (e.g., controller 110, I/O components 140A-N) associated with the anomaly, etc. Based upon such technique selection identification and understanding of the anomaly can be expedited thereby facilitating timely understanding of an anomaly, the source of the anomaly, etc.

As illustrated in FIG. 3, as data is captured for a particular operational state of controller 110 (e.g., command instruction 190B), the data can be stored in datastore 340. For example, as illustrated in FIG. 3, datastore 340 has stored therein captured data 344A-344N which have been captured in relation to one or more operational states of controller 110, or other device in the process control configuration 100 of the industrial automation environment. Storage of previously captured data 344A-344N can facilitate understanding of when an anomaly first occurred, for example.

As previously mentioned, in the event of command instruction 190B being determined by analyzer component 330 to comprise one or more expected data components, one or more components comprising process monitoring configuration 100 can be considered to be operating correctly, e.g., the firmware or the logic of controller 110 has not been compromised.

In an alternative event where command instruction 190B is determined by analyzer component 330 to include at least one instance of unexpected content (e.g., an unexpected command directed to device 140B), at least one component included in process monitoring configuration 100 can be considered by analyzer component 330 to be operating incorrectly, e.g., the firmware or the logic of controller 110 has been compromised. In such an instance, analyzer component 330 can initiate execution of an alarm, or other suitable notification, where the alarm can be generated by alarm component 350. In another instance, operation of a device (e.g., device 140B) may have been compromised, and hence, data being directed to controller 100 (e.g., from device 140B) may contain an anomaly indicating exploitation of the device.

Further, a report component 360 can be utilized to generate one or more reports relating to the operational performance of the one or more components included in the process control configuration 100 of the industrial automation environment. Any suitable report can be generated, such as a report identifying an instance of when an event of a component included in the process control configuration 100 is deemed by analyzer component 330 to be operating in a manner different to that defined in a baseline data configuration. In another embodiment, a report can be generated reporting operation of the one or more components incorporated into process control configuration 100, where the operation can include at least one instance of correct operation, at least one instance of incorrect operation, or combination thereof. The report can be in any suitable format, e.g., include text, information in graphical form, an illustration, a diagram of the industrial automation environment indicating one or more components, devices, machines, etc., that are operating correctly/incorrectly, etc. A report can be generated in any suitable format, e.g., printed out, presented on a display device, stored as digital data, etc.

Analyzer system 150 can further include an update component 370. In a typical process of operation the control commands, instructions, machine settings, etc., for which one or more devices included in an automation environment are to operate may not change for a considerable amount of time. For example, once a manufacturing line is up and running no changes in operation of the one or more devices included in the automation environment may be made for an extended period of time, e.g., a day, a week, a month, etc. However, one or more of the devices may require an adjustment in operation. Continuing the previous example relating to furnace temperature, a different alloy maybe being utilized in the manufacturing process (e.g., the manufacturing process is a diecasting operation) and hence a different holding temperature is required to be configured at the furnace to facilitate holding the new alloy at the required temperature. Accordingly, controller 110 can be configured to subsequently issue a command instruction 190 which includes the new holding temperature. Thus, in view of the new command instruction 190 being generated, a copy of the command instruction 190 can be generated by capture component 120 and forwarded for storage as a new baseline data at analyzer system 150. Updating of baseline data in data store 340 can, in an embodiment, be an operation of replacing a first instance of baseline data pertaining to an operational state with a second instance of baseline data pertaining to the operational state. In another embodiment, updating of baseline data in data store 340 can be an operation of identifying a second instance of baseline data pertaining to an operational state with a different identifier to that utilized for a first instance of baseline data pertaining to the operational state. Other techniques to facilitate unique identification of a first file and a second file relating to an initial and subsequent operational state are known in the art and are not expanded upon herein. Update component 370 can be utilized to facilitate storage of a new baseline data in datastore 340 along with any required operations to facilitate utilization of an instance of baseline data associated with a new operational configuration.

As further illustrated in FIG. 3, analyzer system 150 can further include an authentication component 380. Authentication component 380 can be utilized to facilitate any operation relating to authentication, authorization and accounting (AAA) of operation of one or more components included in the process control configuration 100. For example, analyzer system 150 can be configured to operate with a particular AAA protocol, whereby only a particular individual(s) is able to access operation of analyzer system 150. For example, upon initialization of analyzer system 150, the individual has to enter a username and password to facilitate access to the analyzer system 150. Numerous techniques are known in the art to facilitate AAA operation and are not expanded upon herein.

To facilitate operation of one or more of the components 320-380, a processor 390 can be utilized. In an embodiment, each of components 320-380 can be formed from a self-contained electrical circuit (e.g., an integrated circuit) which a processor incorporated therein. Alternatively, processor 390 can execute instructions stored in datastore 340 (or other memory component). The instructions may be, for instance, instructions for implementing functionality described as being carried out by one or more components 320-380 as presented above, and as further described with reference to FIG. 8.

As previously mentioned, in an embodiment, capture component 120 (or capture component 120A) and/or analyzer system 150 can operate in a forensic manner. Hence, rather than capturing a command instruction or data which is to be compared against baseline data (e.g., baseline data 342A-N), capture component 120 can also capture data being conveyed on backplane 130 and forward the data to the analyzer system 150. Thus, data being conveyed on backplane 130 can be captured and analyzed at analyzer system 150 without any baseline data having to be previously stored in datastore 340.

Figure 4:
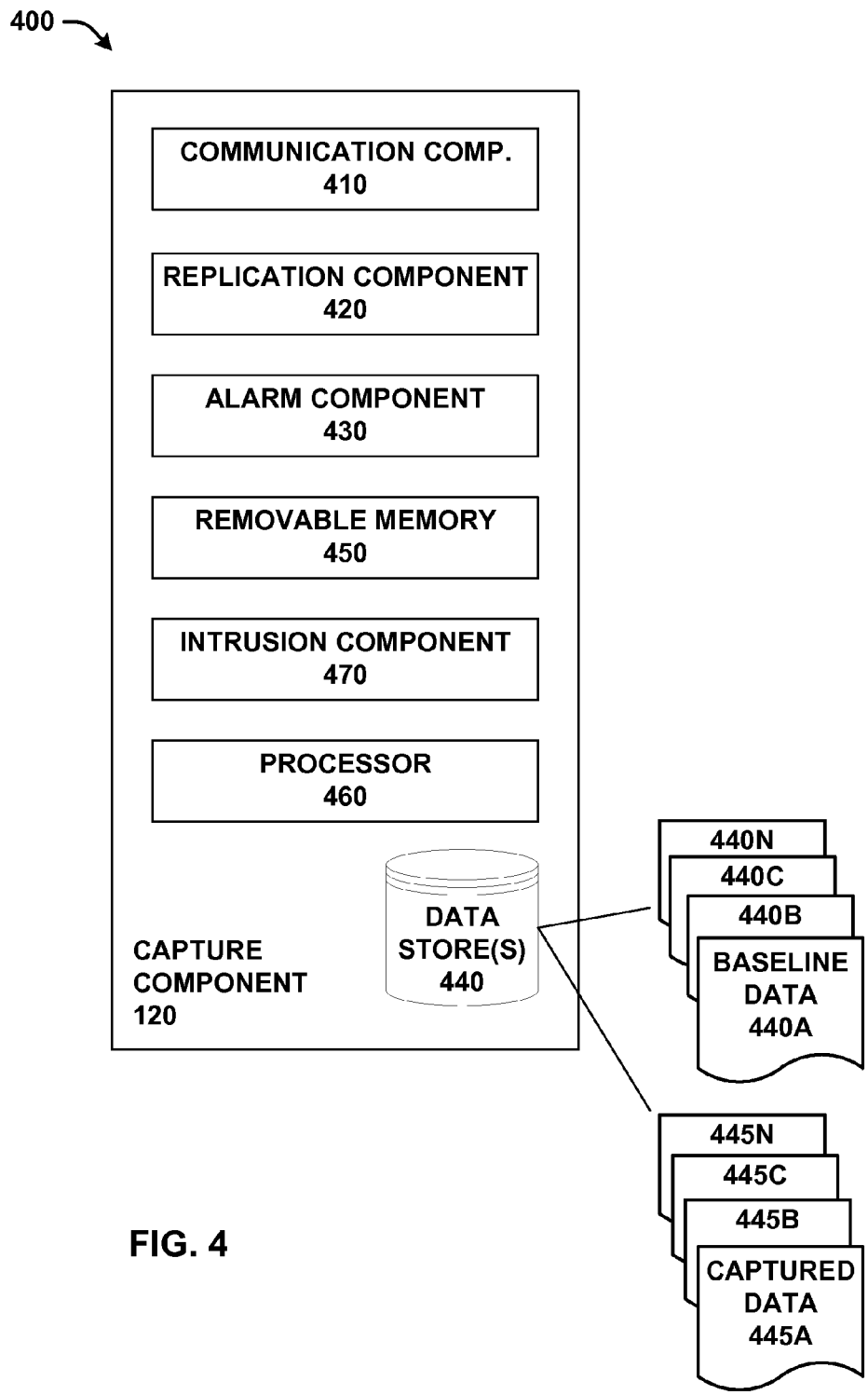
FIG. 4 is a block diagram illustrating an exemplary capture component for interception and forwarding of data being communicated on a backplane.

FIG. 4 illustrates an analyzer configuration 400 according to an exemplary embodiment. Analyzer configuration 400 can include a capture component 120 which can comprise of a plurality of components as described further herein. As previously mentioned, capture component 120 can be in communication with analyzer system 150, whereby capture component 120 can include a communication component 410 which can be utilized to communicate with analyzer system 150 (e.g., via communication component 320) in accord with any communication protocol/format required to facilitate communication between capture component 120 and analyzer system 150 either directly, or via backplane 130.

As previously mentioned, capture component 120 can be utilized to replicate data conveyed across backplane 130 (e.g., between controller 110 and any of devices 140A-140N) and along with facilitating conveyance of the data, etc., across the backplane 130, capture component 120 can also forward a copy of the data, etc., to an analyzer system 150. With reference to FIG. 1, capture component 120 can intercept a command instruction 190 generated by controller 110 and directed, for example, at device 140B, where the command instruction 190 is to be initially conveyed on data-path 160 between controller 110 and capture component 120. Upon receipt of the command instruction 190 at capture component 120 (e.g., interception of command instruction 190 by capture component 120), the command instruction in the form of command instruction 190A can continue from capture component 120 to device 140B along data-path 170. Further, upon receipt of the command instruction 190 at capture component 120, a copy of command instruction 190 can be generated at capture component 120, where the copy of command instruction 190 can be generated by replication component 420, e.g., command instruction copy 190B. Upon generation of the command instruction copy 190B, the command instruction copy 190B can be forwarded by capture component 120 to analyzer system 150 for analysis/storage of the command instruction copy 190B by analyzer system, as previously described.

Capture component 120 can further include an alarm component 430 which can be configured to operate in conjunction with alarm component 350. For example, alarm component 430 can receive from alarm component 350, via communication components 320 and 410, a notification that command instruction 190B has been determined to include unexpected data and hence one or more devices comprising the automation process associated with controller 110 are deemed (e.g., by analyzer system 150) to have been compromised. Accordingly, an alarm can be activated, where such alarm can be an audible alarm, a visual alarm, etc. Further, an alarm notification can be forwarded to controller 110 to indicate to controller 110 that an associated process (e.g., operation of controller 110, operation of any of devices 140A-N, etc.) is deemed to have been compromised and appropriate action is to be implemented. Such action can be of any suitable type such as putting one or more devices associated with process control configuration 100 into a 'safe' operating mode, terminating operation of the one or more devices, terminating the process, etc.

Capture component 120 can further include a processor 390 which can be configured to execute instructions stored in datastore 440 (or other memory component). The instructions may be, for instance, instructions for implementing functionality described as being carried out by one or more components 410-440 as presented above, and as further described with reference to FIG. 8. Further, a removable memory 450 can be incorporated into capture component 120 to facilitate storage of any of baseline data 440A-440N and captured data 445A-445N, whereby memory 450 can be subsequently removed, e.g., as part of a diagnostic operation.

While the various embodiments presented herein relate to capturing command instructions (e.g., command instruction 190 or 196) and comparing them with baseline data (e.g., baseline data 342A-N) to determine a data anomaly, a capture component (e.g., capture component 120 or 120A) can be utilized to control data being conveyed across a backplane (e.g., backplane 130). A capture component can operate as an intrusion prevention system, which for example, in conjunction with analyzer system 150, can capture data being generated by a controller (e.g., controller 110) prior to the data being received at any of devices 140A-N. An intrusion component 470 can be incorporated into capture component 120, wherein the intrusion component 470 can be configured to capture particular data prior to the data being transmitted across control system 100. For example, analyzer component 330 of analyzer system 150 can receive an instruction to prevent data of a known configuration (e.g., data associated with a known malicious attack) from being transmitted from controller 110 across the control system 100. Hence, upon receipt of data having the identified configuration, the data can be captured by intrusion component 470 prior to transmission across process control system 100. Further, existence of the potentially malicious data can be indicated by capture component 120 to analyzer system 150 (e.g., a notification is sent, the captured data is forwarded, etc.) and further, alarm component 430 can be executed to facilitate further indication of the potentially malicious data being determined to exist.

Figure 5:
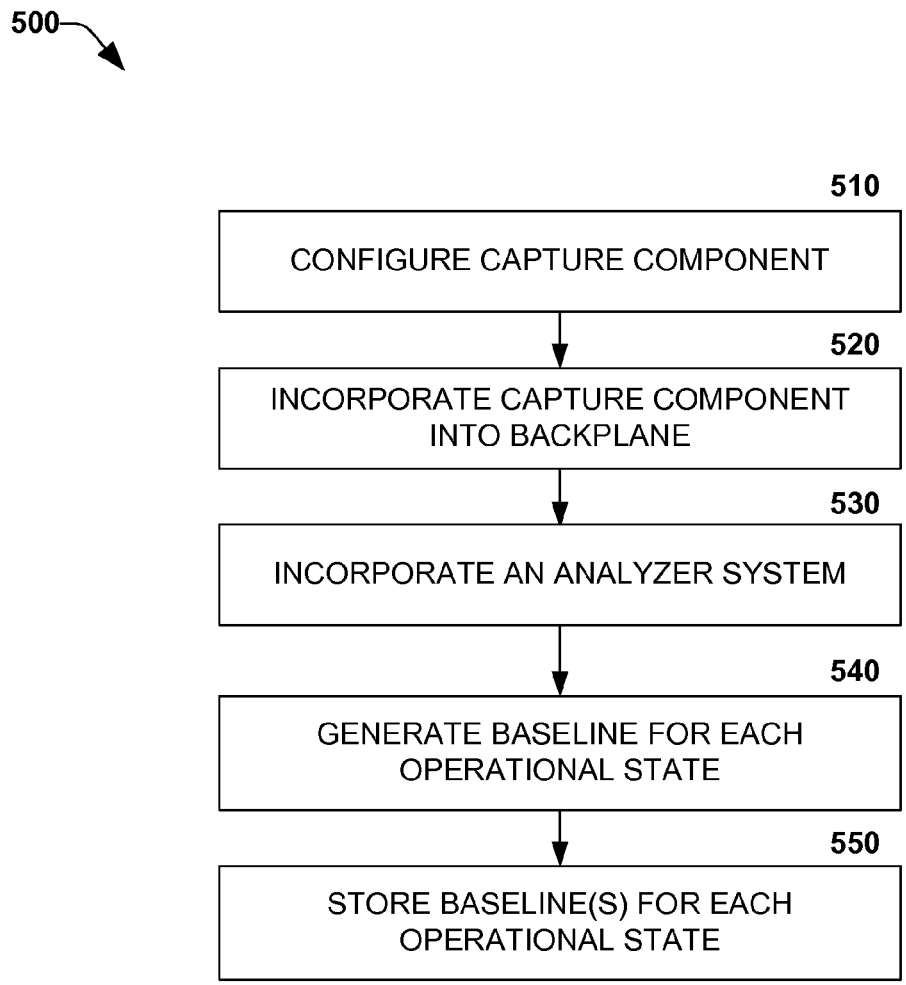
FIG. 5 is a flow diagram illustrating an exemplary methodology for capturing an operational state baseline(s) of one or more devices connected to a backplane.
Figure 6:
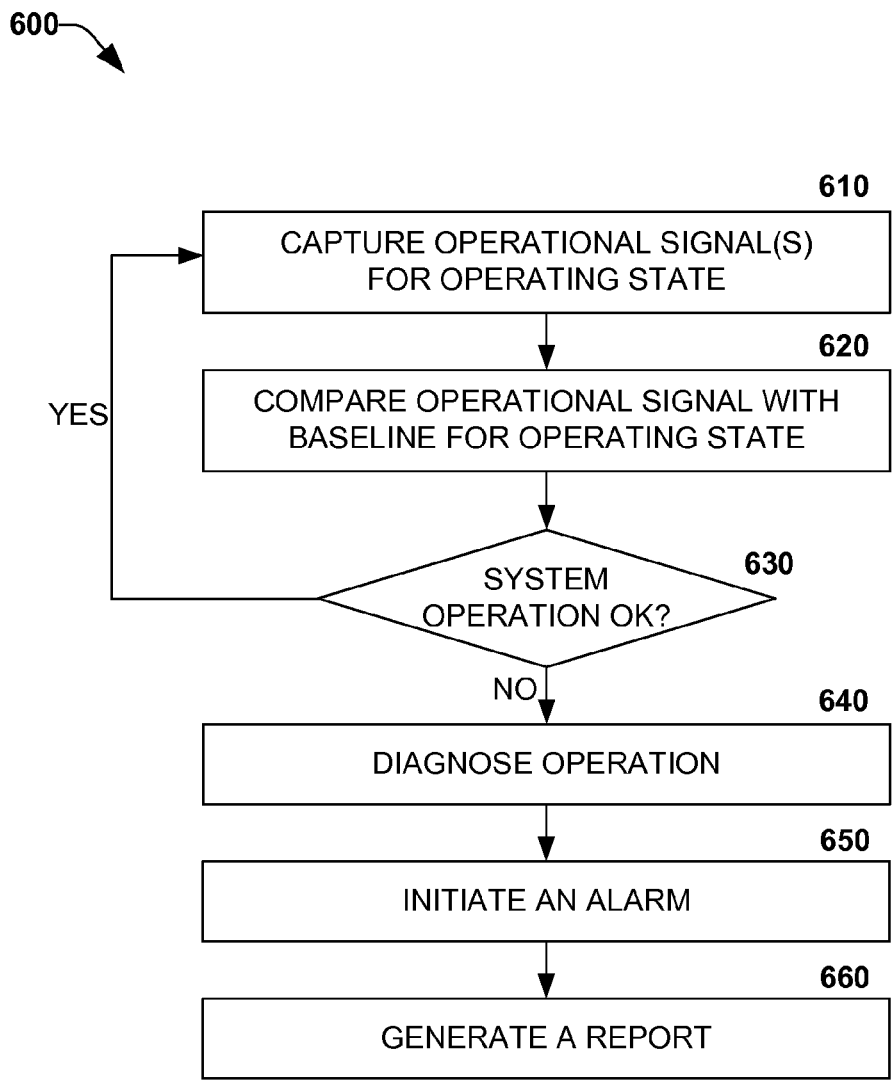
FIG. 6 is a flow diagram illustrating an exemplary methodology for capturing operational data for one or more devices connected to a backplane.
Figure 7:
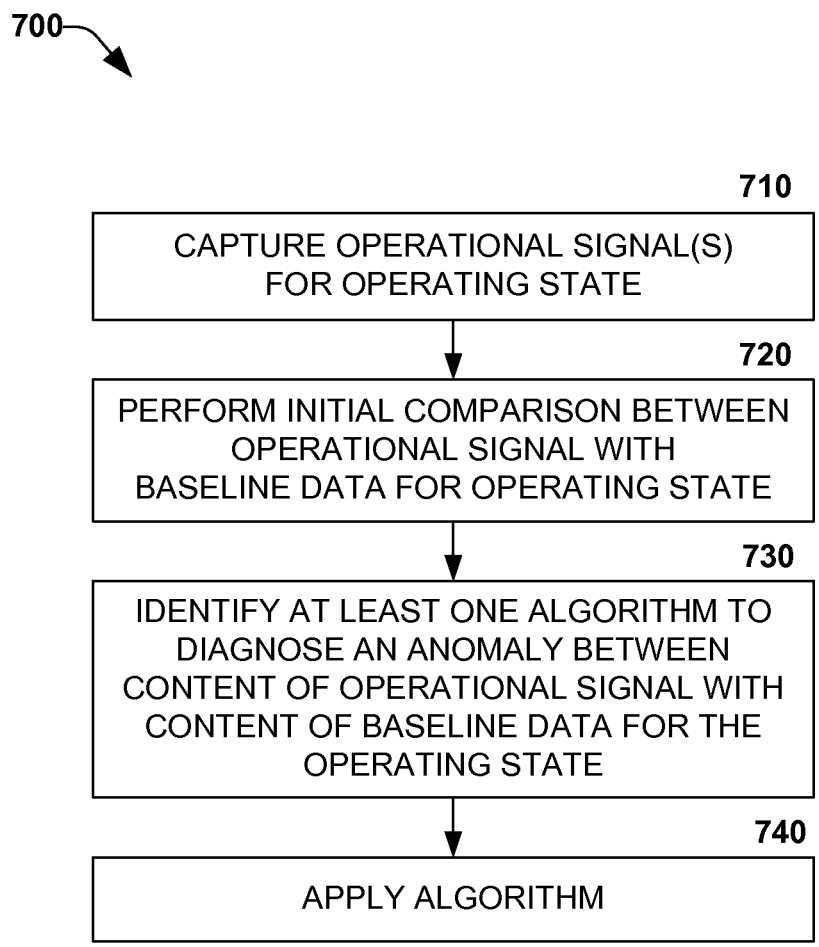
FIG. 7 is a flow diagram illustrating an exemplary methodology for selecting a diagnosis technique.

FIGS. 5-7 illustrate exemplary methodologies relating to determination of unexpected and/or malicious activity occurring between components communicatively coupled across a backplane. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement the methodologies described herein.

FIG. 5 illustrates an exemplary methodology 500 for determining unexpected and/or malicious activity occurring between components communicatively coupled via a backplane. At 510 a capture component can be configured for operation on a backplane. During configuration account can be taken of the communication protocol(s) that may be being utilized between various components comprising an industrial automation process into which the capture component is to be incorporated. As previously mentioned, a capture component can include the necessary hardware, firmware, logic, etc., to facilitate conveyance of data between a controller component, and at least one device operating in conjunction with the controller component, whereby the controller component and the at least one device are connected to, and communicating via, a backplane. In an alternative embodiment, a capture component can be operating in conjunction with a configuration component, whereby the configuration component facilitates conversion of one or more protocols/formats as required to facilitate conveyance of data between a controller component and any other device communicatively coupled to the controller component via a backplane. Further, the capture component and/or the configuration component can enable protocol conversion to facilitate transmission of data between the capture component and an analyzer system to facilitate analysis of data being communicated on the backplane.

At 520, the capture component can be incorporated into a process control and monitoring system. The capture component can be incorporated into the system at any suitable location to facilitate interception of data being conveyed between various components comprising an automation system which includes the process control and monitoring system. For example, in an embodiment, the capture component can be located on a backplane where the backplane is conveying data between a controller component and a device (e.g., an I/O device) associated with operation of a machine, engine, tool, etc., whereby the controller component is configured to control the machine, etc. In another embodiment, the capture component can be located in the controller component facilitating interception of data being generated and/or received by the controller component.

At 530, an analyzer system can be incorporated into the process control system, whereby the analyzer system can be utilized to review, and further diagnose, data being transmitted between components associated with the backplane. In an embodiment, the analyzer system can be connected directly to the capture component to facilitate communication of data therebetween. In another embodiment, the analyzer system can be connected to the capture component via the backplane, whereby communication of data between the capture component and the analyzer system is via the backplane. With reference to 520, in another embodiment, the capture component can be incorporated into the analyzer system, for example, the analyzer system may form part of a HMI or a GUI associated with the process control system, e.g., the HMI/GUI is operating on a machine, whereby the machine is being controlled at least in part by the controller component which is in communication with the capture component.

At 540, the controller can be stepped through a number of operational states (e.g., 'furnace holding temperature', 'milling speed', etc.) and data which is conveyed, via the backplane, to a device (e.g., an I/O device) can be intercepted and a copy made of the data, and subsequently, a copy of the data can be forwarded to the analyzer system. As previously mentioned, the copy of the data can act as a baseline identifying what content of the data is conveyed on the backplane during each operational state of the controller.

At 550, each data copy can be stored at the analyzer system as baseline data for each operational state of the controller. As previously mentioned, each baseline data can be uniquely identified to facilitate storage and subsequent retrieval of the baseline data. As further described herein, the baseline data can act as a foundation against which data being conveyed on the backplane can be compared with during operation of the controller or other devices.

FIG. 6 illustrates a methodology 600 for comparing operational data with baseline data to facilitate determination of unexpected and/or malicious activity occurring between components communicatively coupled via a backplane. As previously described with reference to at least FIG. 5, for each operational state of a controller (and associated process) baseline data can be captured and stored as reference data against which data captured during operation of the controller and any other devices can be compared against. At 610, during operation of the controller or any other device associated with the process control and monitoring operation(s), data being communicated over the backplane can be captured for a given operational state of the process control/monitoring operation. The operational data can be intercepted by the capture component, while the operational data can be forwarded onto the receiving device, a copy of the operational data can be generated by the capture component and forwarded to the analyzer system.

At 620, the previously stored baseline data can be retrieved for comparison with the newly captured operational data for the operational state.

At 630, based upon the comparison, operation of the process associated with the controller component can be reviewed to ascertain whether the process is operating according to an expectation or the operational data contains data of which an equivalent data was not captured during the formation of the baseline data. In response to a determination that the operational data comprises the same content as the baseline data, a determination can be made that the process associated with the controller is operating in an expected manner and the flow returns to 610 in readiness for operational data for a subsequent operating state to be captured and analyzed.

In response to a determination at 630 that the operational data has content different to that captured in the baseline data, the flow can proceed to 640, where a diagnosis operation can be performed to identify the difference between that operational data and the baseline data, and further, why the difference in content may have occurred.

At 650, in association with determining that there is an anomaly in the content of the operational data versus the baseline data an alarm, or similar notification can be generated. For example, an alarm notification can be generated by the analyzer component with the alarm activating a light, a speaker, etc. Further, the alarm notification can be forwarded to the controller to facilitate placing operation of the process associated with the controller into any of a safe operating state, close the process down, etc.

At 660, further, a report can be generated indicating operation of the controller and any devices associated with a process being controlled by the controller. The report can present data reflecting any of expected operation of the controller and associated process(es), an anomaly between received data for a particular operational state versus a baseline data, or combination thereof. The report can be presented by any suitable technology such as in printed form, displayed on a display device, digitally stored, etc.

FIG. 7 illustrates a methodology 700 for identifying an algorithm to facilitate in comparing operational data with baseline data. As previously described, an analyzer system can be utilized to compare operational data for an operational state of a controller and/or associated process with baseline data previously captured for the operational state. At 710, an operational signal is captured for an operating state.

At 720, an initial comparison can be performed, e.g., by an analyzer system, between the content of newly received operational data in comparison with content of previously received, baseline data.

At 730, based on the determined anomaly, one or more techniques can be selected from a plurality of available techniques (e.g., distance based technique, a support vector analysis, cluster analysis, etc.), where a selected technique can facilitate identification of the anomaly, one or more components or devices (e.g., controller 110, I/O components 140A-N) associated with the anomaly, etc. Selection of a technique can be based on any suitable logic, such as artificial intelligence (AI), whereby the AI can review previously diagnosed anomaly instances and based thereon, can generate knowledge with regard to which technique(s) in the plurality of available techniques is best-suited in providing a diagnosis of the anomaly and other pertinent information (e.g., compromised machine, anomaly type, extent of the anomaly, etc.). Based upon such technique selection identification and understanding of the anomaly can be expedited thereby facilitating timely understanding of an anomaly, the source of the anomaly, etc.

At 740, an algorithm or other methodology associated with the selected technique(s) can be applied to the operational data, baseline data, combination thereof, etc., to facilitate understanding of the anomaly.

Figure 8:
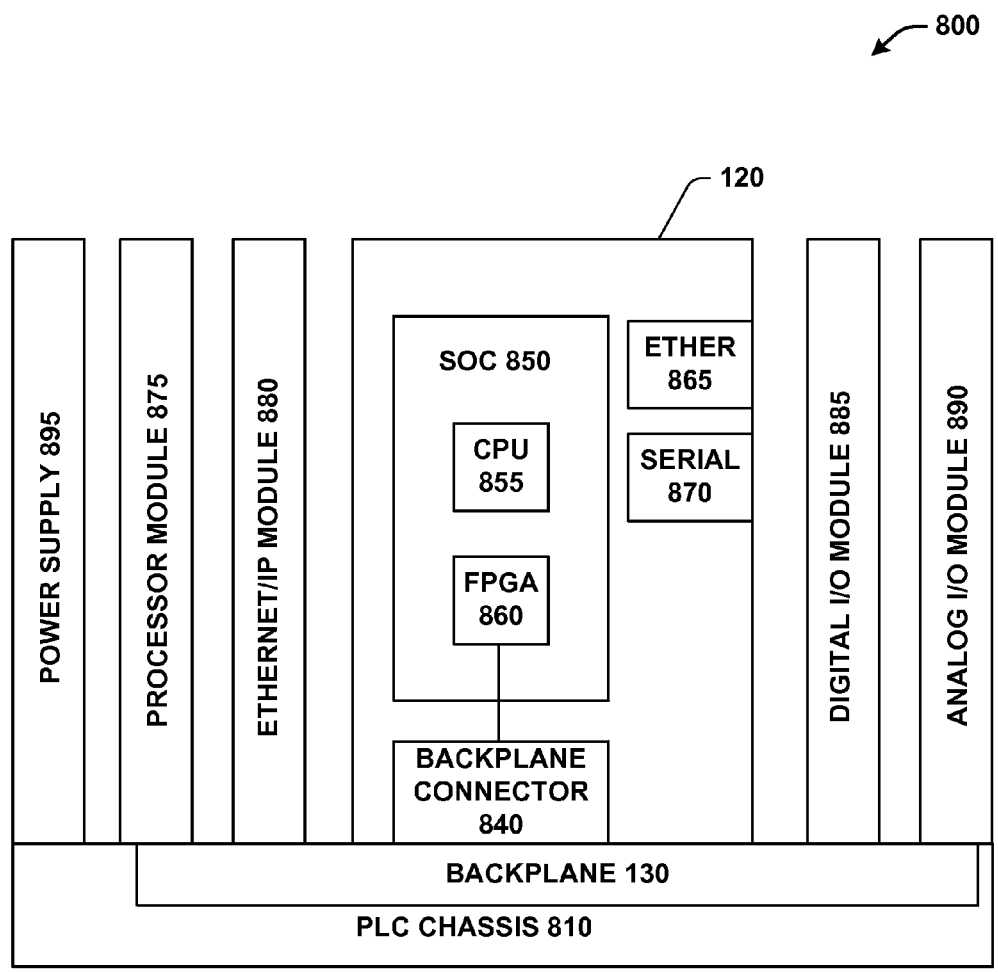
FIG. 8 is a block diagram illustrating an exemplary configuration for a capture component in conjunction with a chassis and other components.

FIG. 8 illustrates an exemplary configuration 800 of a capture component and other components for inclusion in a process monitoring system. Configuration 800 can include a PLC chassis 810 which further includes backplane 130. The PLC chassis 810 can be constructed to support various modules as required for operation of a process. Backplane 130 can be incorporated into the PLC chassis 810, whereby backplane 130 provides a communication path between the various I/O modules, a controller, a capture component, a controller, a processor, an I/O communication adapter module, etc. A capture component 120 can be incorporated into the chassis 810 (e.g., via a slot in chassis 810) with the capture component 120 in communication across the backplane 130 via backplane connector 840. Capture component 120 can further include a system on a chip (SOC) component 850 which can include the necessary components to facilitate operation of the capture component 120. For example, SOC component 850 can include a processor 855 which can be utilized to perform one or more operations as required to facilitate operation of the capture component 120. SOC component 850 can further include a field programmable gate array (FPGA) 860 which can be programmed as necessary to facilitate capture of data by the capture component 120. Any suitable communication technology can be utilized to facilitate communication of data between the capture component 120 and any associated device/system (e.g., analysis system 150), where such communication technology can include packet data (e.g., via Ethernet connector 865) and serial communication (e.g., via serial connector 870). Other components can be co-located with the capture component 120, including any of a processor module 875, a communication module (e.g., Ethernet/IP module 880), a digital I/O module 885 and an analog I/O module 890, as required to facilitate operation of the capture component 120 in a process control/monitoring system. Further, any suitable system for providing power to the various components comprising configuration 800, for example a power supply 895 can be incorporated into the PLC chassis 810.

Figure 9:
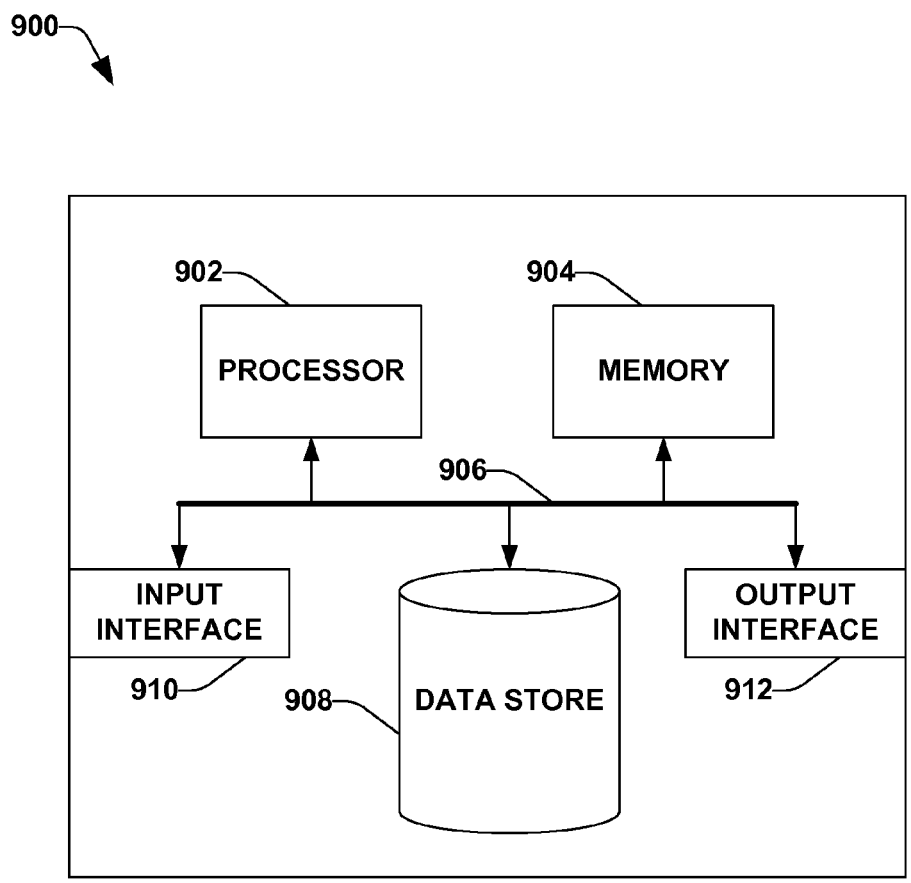
FIG. 9 illustrates an exemplary computing device.

Referring now to FIG. 9, a high-level illustration of an exemplary computing device 900 that can be used in accordance with the systems and methodologies disclosed herein is illustrated. For instance, the computing device 900 may be used in a system to determine unexpected and/or malicious activity occurring between components communicatively coupled across a backplane. The computing device 900 includes at least one processor 902 that executes instructions that are stored in a memory 904. The instructions may be, for instance, instructions for implementing functionality described as being carried out by one or more components discussed above or instructions for implementing one or more of the methods described above. The processor 902 may access the memory 904 by way of a system bus 906. In addition to storing executable instructions, the memory 2004 may also store operating parameters, required operating parameters, and so forth.

The computing device 900 additionally includes a data store 908 that is accessible by the processor 902 by way of the system bus 906. The data store 908 may include executable instructions, operating parameters, required operating parameters, etc. The computing device 900 also includes an input interface 910 that allows external devices to communicate with the computing device 900. For instance, the input interface 910 may be used to receive instructions from an external computer device, from a user, etc. The computing device 900 also includes an output interface 912 that interfaces the computing device 900 with one or more external devices. For example, the computing device 900 may display text, images, etc., by way of the output interface 912.

Additionally, while illustrated as a single system, it is to be understood that the computing device 900 may be a distributed system. Thus, for instance, several devices may be in communication by way of a network connection and may collectively perform tasks described as being performed by the computing device 900.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

What has been described above includes examples of one or more embodiments. It is, of course, not possible to describe every conceivable modification and alteration of the above structures or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A system comprising:
a capture component interposed between a controller and a backplane, the backplane is utilized for communication of data between the controller and a device under control of the controller, the capture component is configured to:
capture operational data, the operational data identified as corresponding to an operational state of the controller, the operational data based upon a first control signal generated by the controller and directed to the device at a current point in time; and
an analyzer system configured to:
compare the operational data with baseline data, the baseline data identified as corresponding to the operational state of the controller, the baseline data based upon a second control signal generated by the controller and directed to the device at a previous point in time;
based at least in part upon the comparison, identify an anomaly between content of the operational data and content of the baseline data; and
generate an alarm for receipt by an operator responsive to identifying the anomaly between the content of the operational data and the content of the baseline data.

2. The system of claim 1, the capture component is further configured to capture the baseline data.

3. The system of claim 1, the controller is a programmable logic controller.

4. The system of claim 2, the capture component is configured to capture at least one of the operational data or the baseline data as the at least one of the operational data or the baseline data is transmitted between the controller and the device in communication with the controller.

5. The system of claim 4, the controller, the backplane and the device are incorporated into an industrial automation process.

6. The system of claim 1, further comprising a data store configured to store at least one of the baseline data or the operational data.

7. The system of claim 1, the alarm indicating that the controller has been compromised.

8. The system of claim 1, the capture component further configured to transmit the operational data to the device over the backplane.

9. The system of claim 1, the operational data is further based upon return data transmitted from the device to the controller at the current point in time.

10. The system of claim 1, the analyzer system further configured to transmit a signal to the controller that causes the controller to operate in a safe operating mode responsive to the analyzer component identifying the anomaly.

11. A method, comprising:
capturing, across a backplane and at a first point in time, baseline data generated by a controller, the baseline data identified as corresponding to an operational state that is to be applied to a device at the first point in time, the device is controlled by the controller;
capturing, across the backplane and at a second point in time that is subsequent to the first point in time, operational data generated by the controller, the operational data identified as corresponding to the operational state that is to be applied to the device at the second point in time, the baseline data and the operational data captured from a data path on the back lane between the controller and the device;
comparing the operational data with the baseline data;
identifying, based on the comparing of the operational data with baseline data, an anomaly between content of the operational data and content of the baseline data; and
responsive to identifying the anomaly, generating an alarm that is configured to inform an operator of the anomaly between the baseline data and the operational data.

12. The method of claim 11, wherein the controller is a programmable logic controller.

13. The method of claim 11, wherein comparing the operational data with the baseline data comprises:
converting the operational data to a format to generate converted operational data; and
comparing the converted operational data with the baseline data.

14. The method of claim 11, further comprising storing the baseline data for subsequent retrieval to facilitate comparing the operational data with the baseline data.

15. The method of claim 11, wherein capturing the baseline data comprises:
intercepting a data transmission between the controller and the device; generating a copy of the data transmission; and
storing the copy of the data transmission as the baseline data.

16. The method of claim 11, the alarm indicating that the controller has been compromised.

17. The method of claim 11, further comprising transmitting, across the backplane, the operational data to the device.

18. A computer-readable storage medium comprising instructions that, when executed by a processor, cause the processor to perform acts comprising:
capturing baseline data and operational data, wherein the operational data is based upon a first control signal generated by a controller and directed to a device under control of the controller, the baseline data based upon a second control signal generated by the controller and directed to the device under the control of the controller, both the operational data and the baseline data identified as corresponding to an operational state of the controller, the baseline data captured prior to the operational data, and the baseline data and the operational data being captured between a controller and the device in communication with the controller, the communication being via a backplane connecting the controller with the device;
comparing the operational data with the baseline data;
identifying, based on the comparing of the operational data with the baseline data, an anomaly between content of the operational data and content of the baseline data, the anomaly indicating that the controller has been compromised; and
responsive to identifying the anomaly between the content of the operational data and the content of the baseline data, transmitting an alarm to an operator that indicatives that the controller has been compromised.

19. The computer-readable storage medium of claim 18, wherein the controller and the device are incorporated into a process control system.

20. The computer-readable storage medium of claim 18, the controller is a programmable logic controller.

* * * * *